United States Patent [19]

Blasnik

[11] 4,295,688

[45] Oct. 20, 1981

[54] BEARING CONSTRUCTION

[75] Inventor: William Blasnik, Demarest, N.J.

[73] Assignee: Hardware Designers, Inc., Mt. Kisco, N.Y.

[21] Appl. No.: 124,094

[22] Filed: Feb. 25, 1980

[51] Int. Cl.³ .................. F16C 19/16; F16C 29/04; F16C 35/06
[52] U.S. Cl. ............................... 308/3.8; 308/182; 308/191
[58] Field of Search ............... 308/3.8, 6 R, 20, 182, 308/190, 191

[56] References Cited

U.S. PATENT DOCUMENTS

| | | | |
|---|---|---|---|
| 3,290,100 | 12/1966 | Leciejewski | 308/6 R |
| 3,469,892 | 9/1969 | Langstroth | 308/191 |
| 3,824,658 | 7/1974 | Donahue et al. | 308/190 |
| 4,006,945 | 2/1977 | Sekerich | 308/191 |
| 4,145,093 | 3/1979 | Sekerich | 308/190 |

OTHER PUBLICATIONS

Recknagel, "Nylon Parts for Ball Bearings", *Product Engineering*, Feb., 1952, pp. 119-123.

*Primary Examiner*—Richard R. Stearns
*Attorney, Agent, or Firm*—Mark T. Basseches; Paula T. Basseches

[57] ABSTRACT

The present invention is directed to an improved bearing construction of the ball bearing type which is particularly suitable for supporting drawer slides and the like for translatory movement. The bearing comprises a tire defining an outer bearing race, a stud defining an inner bearing race, a plurality of balls captured between the races, the device being characterized by the stud including an axially directed annular retainer surface, portions of which are deflected radially, which deflected portions provide a temporary connection precluding separation of the bearing elements. The annular surface, after deflection, defines a stop or locator surface against which a support bracket is biased in the final assembled position thereof, the corrugated or crown-like end surface formed as a result of deflection, providing a high frictional surface whereby augmented connection between the bearing and the support bracket is assured.

5 Claims, 4 Drawing Figures

BEARING CONSTRUCTION

BACKGROUND OF THE INVENTION

1. Field of the Invention

The present invention is in the field of bearing devices and pertains more particularly to an improved ball bearing assembly especially adapted for use in supporting drawer slides or the like. The invention further pertains to a bearing device which includes means for temporarily retaining the bearing components in assembled conditions pending permanent attachment of the device, as to a support bracket.

2. The Prior Art

In prior slides or like mechanisms, it is conventional to employ anti-friction devices, such as ball bearings or the like. In a typical construction, a channel member may be fitted either to a drawer or a cabinet component of an article of furniture, the other relatively movable component being fitted with a bracket carrying a tire or wheel. The tire or wheel is mounted within the channel for translatory movement, a bearing assembly being interposed between the tire and bracket whereby free movement between the components is assured. Numerous designs of bearing mechanisms exist for effectuating the purpose hereinabove set forth.

A highly desirable attribute of bearing devices, as heretofore noted, is that the same be susceptible of assembly whereby the inner and outer races and balls are integrated into a unit which may be subsequently attached to a mounting bracket. The device, thus, is in contrast to other units heretofore known, such as may be exemplified by U.S. Pat. No. 4,006,945 where the bearing components are not reliably united until after the bearing itself has been affixed to a bracket.

Further, it is highly desirable that after the bearing is secured to the bracket, an operation typically carried out by staking or turning over portions of the bearing assembly after the same have been passed through an aperture in the bracket, relative movement between the bracket and staked portion of the bearing structure, be eliminated.

By way of example, the conventional bearing construction wherein the inner race portion is formed by a stud having an annular shoulder normal to the axis of the bearing is inserted by passing components of the stud through an aperture in the bracket until the shoulder engages a surface of the bracket and thereafter pinning or staking portions of the stud extending through the bracket against the face of the bracket remote from the shoulder. In such constructions there is a substantial tendency for the bracket and supporting stud, after usage, to become loose and to wobble or even for the stud to rotate relative to the bracket. In extreme cases, the axis of the bearing may become displaced from the desired perpendicular relation relative to the bracket and to wobble in its connection with the bracket, with resultant undue drag when the drawer is operated.

In order to eliminate or minimize the possibility of a weakened connection between the bracket and the bearing stud, it has heretofore been proposed to interpose a lock washer or the like between the components. The use of a lock washer, however, is undesirable in that it involves an additional operation (positioning the lock washer) and further in that the orientation or displacement of the tire member is a function of the degree of compression applied to the lock washer.

Additionally, if the thickness of the lock washer is not maintained within a high degree of tolerance, the lateral offset of the tire from the bracket may vary within an undesirably wide range.

In order to overcome the difficulties inhering in the use of a lock washer, it has been proposed to corrugate or emboss the face of the stud engaging the bracket in such manner that it presents a high degree of friction or corrugation, resistance to wobble, rotation and wear. As an example of such construction reference is made to U.S. Pat. No. 3,469,892.

SUMMARY

The present invention may be summarized as directed to an improved roller apparatus including a wheel or tire defining the outer race of a ball bearing, a stud defining the inner race of the bearing, and a plurality of balls captured between the two races.

The tire includes a recess surrounding the shank or projecting portion of the stud. The projecting portion includes an annular shoulder configuration extending outwardly beyond the surface of the tire, portions of the annular surface being deflected into the recess whereby the radially deflected portions lock the components of the bearing against axial separation pending final attachment of the bearing to a bracket.

The remaining components of the annular member, after deflection of the annular portions, present an axially directed crown or corrugated surface which, following attachment of the bearing to a bracket, engage against a side surface of the bracket.

The annular surface portion thus provides a reliable stop portion for depthwise location of the tire relative to the bracket and also provides a high friction corrugated surface which, following peening of the stud, precludes relative movement of the stud and the bracket components.

It is accordingly an object of the invention to provide an improved bearing device especially adapted for use in sliding drawer constructions.

A further object of the invention is the provision of a device of the type described wherein the bearing components may be reliably assembled in such manner that they cannot inadvertently become separated pending attachment to a drawer bracket or the like.

Still a further object of the invention is the provision of a roller assembly of the type described wherein the surface of the assembly which abuts the bracket following attachment is of corrugated configuration, providing a tightly locked connection between the parts, minimizing the possibility of wobble, rotation of the stud relative to the bracket or like misalignment of the parts.

To attain these objects and such further objects as may appear herein or be hereinafter pointed out reference is made to the accompanying drawings, forming a part hereof, in which.

Figure 1:
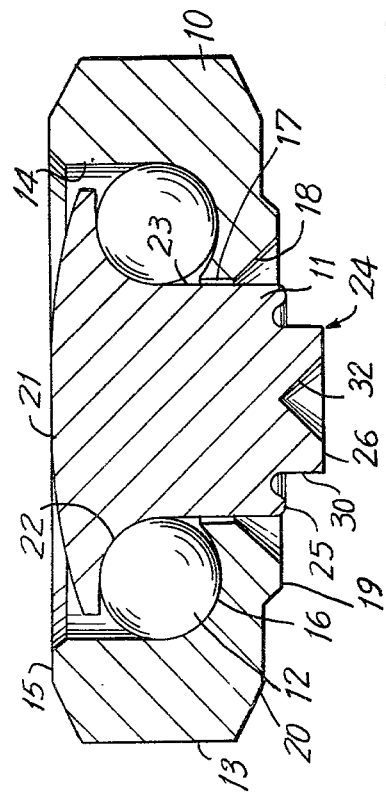
FIG. 1 is a horizontal sectional view of the partly assembled bearing components.
Figure 2:
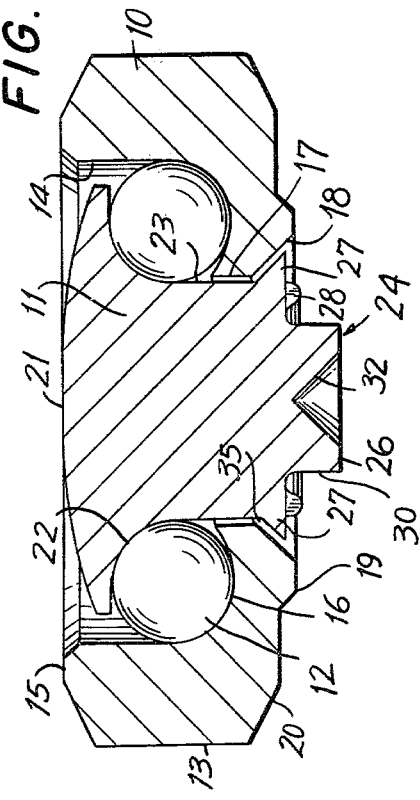
FIG. 2 is a view similar to FIG. 1 showing the position of the parts after assembly of the bearing components.

Turning now to the drawings, there is disclosed in FIG. 1 a bearing device comprising a tire member 10, a stud portion 11 and a series of balls 12.

The tire member 10 includes an outer peripheral surface 13 defining a runner surface adapted to roll along a channel flange or the like.

The tire 10, which preferably is formed of nylon, Delrin or like long chain polyamide material, includes an enlarged bore portion 14 extending axially from one end 15 and terminating in an outer bearing race 16 directed generally toward the open end 15.

The tire or runner member 10 includes a reduced bore portion 17 at the inner end of the race 16, the bore portions 14 and 17 being aligned with the intended axis of rotation of the tire and concentric thereto. The bore portion 17 terminates in an outwardly facing enlarged recess portion 18.

The tire 10 includes, in addition, a shoulder portion 19 at its other end 20, the shoulder portion 19 projecting outwardly in an axial direction further than any other portion of the tire.

A series of balls 12 are seated in the outer race 16.

A stud member 11 is mounted within the bores 14 and 17 of the tire and includes a head portion 21 at its outer end. The undersurface 22 of the head portion 21 defines an inner race, the balls being captured between the races 16 and 22.

The stud portion 21 includes a shank 23 extending outwardly through the narrow bore portion 17 of the tire, the clearance between the shank 23 and the narrow bore portion 17 being greater than the clearance between the bearing races and balls whereby relative rotation of the tire about the stud is effected without contact between the shank and the narrow bore portion 17.

The inner end 24 of the stud 21 is defined by an outwardly facing raised annular configuration or collar 25 and a reduced diameter central attachment portion 26.

After the stud has been assembled within the tire as shown in FIG. 1, the components are held together against inadvertent removal by outward deflection of a plurality of tabs or portions 27 of the annular member 25, the portions 27 being struck inwardly and radially so as to lie within the recess 18 formed in the tire. As is evident from the figures, the outermost edge or end of the annular portion 25 lies in a plane axially outwardly of the annular shoulder 19 of the tire.

Figure 4:
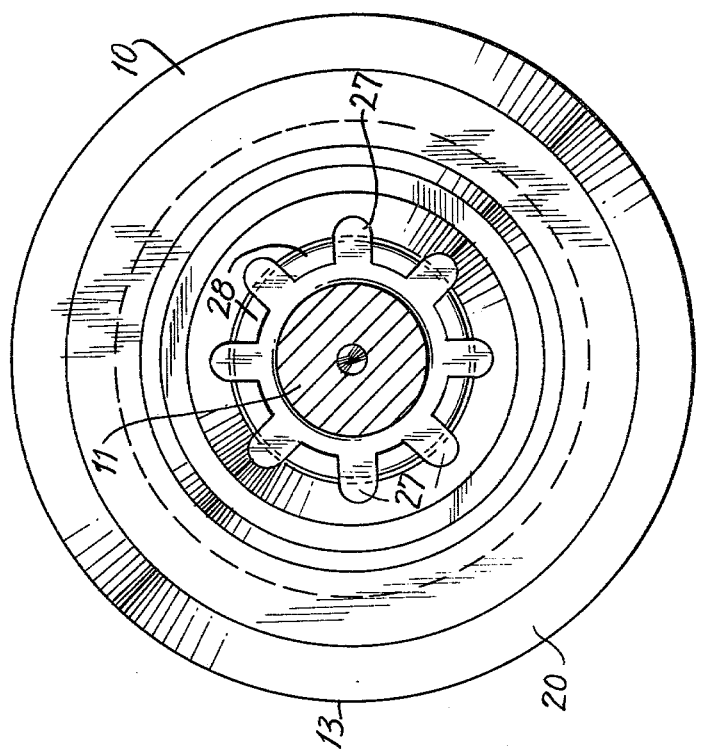
FIG. 4 is a section taken on the line 4—4 of FIG. 3.

After formation of the multiple tabs 27 which in essence lock the stud and tire together against axial separation, it will be observed that the end of the annular portion 25 is formed into a crown-like configuration— see FIG. 4. The crown-like configuration is defined by the crest portions 28 remaining after the tabs 27 have been struck from the initially annular configuration 25. The crest portions 28 define stop members engaging the inner surface of bracket 29 when the bearing member is attached to the bracket and preferably present sharp side edges.

Figure 3:
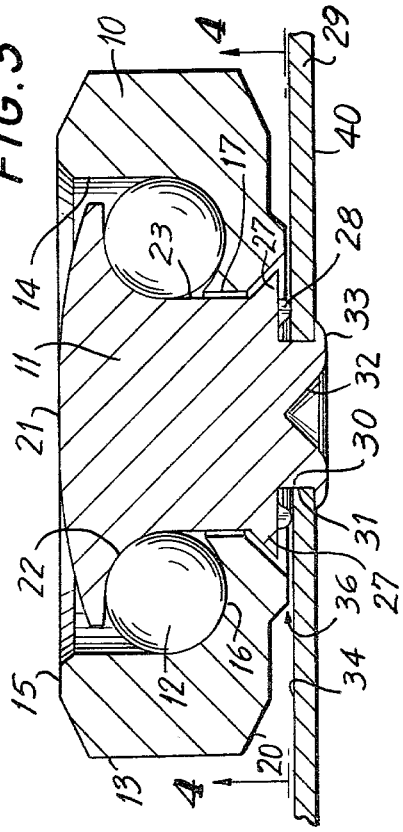
FIG. 3 is a view similar to FIGS. 1 and 2 showing the bearing device attached to a bracket.

As best seen in FIG. 3, attachment of the bearing is effected by sleeving cylindrical portion 30 into aperture 31 formed in the bracket 29 and thereafter outwardly deforming the attachment portion 26 (which has been weakened to facilitate deformation by the provision of a central indentation 32) to the position shown in FIG. 3 wherein an annular flange of metal 33 laps the outer surface 34 of the bracket 29 and the crests 28 defining a crown configuration engage against the inner surface 34 of the bracket. The pressure generated in the course of formation of the flange 33 is sufficient to cause the crown configuration defined by the crests 28 to bear tightly against and slightly to indent the surface 34 of the bracket whereby an intimate and permanent connection between the parts is produced. The crown, in essence, acts in the manner of a lock washer, assuring the desired permanent and immovable connection of the parts.

Deflection of the tabs 27 is effected in such manner that the axial clearance distance in the area 35 between the tabs and the recess 18 is greater than the axial spacing or distance 36 between the shoulder 19 and the leading edge of the crests 28. In this manner it is assured that in the event of any relative axial movement between the stud and the tire in the course of rotation of the tire about the stud, there can be no contact between the tabs 27 and the recess surface 18. Instead, axial movement is limited by the spacing of the annular shoulder 19 from the surface 34 of the bracket 29.

From the foregoing discussion it will be evident that there is described a bearing construction wherein the parts forming the bearing, namely the tire, the stud and the balls, are reliably assembled against separation, enabling the bearing subassemblies to be shipped and subsequently attached to brackets.

Final assembly of the bearings to the brackets is effected by a simple staking or stamping operation, deforming the portion 24 of the stud in such manner that the bracket is tightly impressed against the crown-like or corrugated surface remaining after and as a result of the deflection of the tabs 27.

It will thus be apparent that a double function is performed by the annular portion 25 of the stud whereby the same operation which secures an initial attachment of the bearing components also results in the formation of an anti-friction, crown-like configuration which, upon application of the bearing to a bracket, assures a rigid and permanent connection of the parts, highly resistant to rotation or slippage relative to the bracket.

As will be evident to those skilled in the art who have been appraised of the instant disclosure, numerous variations may be made therein without departing from the spirit of the invention. Accordingly, the invention is to be broadly construed within the scope of the appended claims.

Having thus described the invention and illustrated its use, what is claimed as new and is desired to be secured by Letters Patent is:

1. A bearing device for supporting drawers or the like for translatory movement, said device comprising a generally disk-shaped polymeric tire member including a circular peripheral surface defining a runner, an enlarged bore portion extending axially from one end face of said tire member and terminating in an outer bearing race directed toward said one end face, a reduced bore portion extending from the other end face of said tire member and merging with said outer race at the radial innermost end of said race, an annular recess formed on the outer face of said other end of said tire member and forming a radial outward extension of said reduced bore portion, a metallic stud member forming a fixed component of said bearing member, said stud member including an enlarged head portion at one end disposed within said enlarged bore portion and a generally cylindrical shank extending outwardly through said reduced bore portion, an inner bearing race formed on said stud member at the transition between said head portion and shank portion, a plurality of spherical members interposed between said outer and inner bearing races, an annular collar member formed at the other end of said stud member and projecting outwardly beyond said reduced diameter bore, a plurality of tab portions struck from said collar member, said tab portions being disposed within said recess at positions axially outwardly of said reduced diameter bore whereby the axially outwardly directed face of said collar member, after formation of said tab portions, presents an axially directed, discontinuous crown configuration, the axial terminal portions of said crown configuration lying in a plane axially beyond all portions of said other face of said tire member, said stud member including, in addition, a cylindrical deformable attachment member extending axially beyond said plane of said crown configuration whereby said bearing member may be mounted within an aperture in a bracket with said crown configuration engaging one face of said bracket and turned-over increments of said attachment member engaging the opposite face of said bracket.

2. A bearing device in accordance with claim 1 wherein the axial spacing of said tab portions from the outer face portions of said other end of said tire member defining said recess is greater than the axial spacing of said plane from a plane tangent to the outermost portions of said other face of said tire member.

3. A bearing device in accordance with claim 2 wherein said crown configuration is defined by a series of crests, the side edge portions of said crests, produced as a result of formation of said tabs, presenting a sharpened, high friction configuration.

4. A bearing assembly in accordance with claim 3 wherein said crown configuration is defined by at least four said crests.

5. A bracket assembly comprising a bearing in accordance with claim 4, a bracket member including an aperture, portions of said shank of said stud extending through said aperture, said crown configuration being engaged against one face of said bracket member surrounding said aperture and portions of said shank of said stud member being engaged against the other face of said bracket member surrounding said aperture whereby said stud member is clampingly secured to said bracket member against rotary or tilting movement.

* * * * *